United States Patent
Do et al.

(10) Patent No.: US 8,180,012 B1
(45) Date of Patent: May 15, 2012

(54) ISI PATTERN-WEIGHTED EARLY-LATE PHASE DETECTOR WITH FUNCTION-CONTROLLED OSCILLATION JITTER TRACKING

(75) Inventors: Viet Linh Do, Carlsbad, CA (US); Wei Fu, San Diego, CA (US); Arash Farhoodfar, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 479 days.

(21) Appl. No.: 12/574,591

(22) Filed: Oct. 6, 2009

Related U.S. Application Data

(63) Continuation-in-part of application No. 12/539,516, filed on Aug. 11, 2009, which is a continuation-in-part of application No. 12/507,034, filed on Jul. 21, 2009, which is a continuation-in-part of application No. 12/399,861, filed on Mar. 6, 2009, which is a continuation-in-part of application No. 11/954,325, filed on Dec. 12, 2007.

(51) Int. Cl.
*H04L 7/00* (2006.01)

(52) U.S. Cl. ........................................................ 375/371

(58) Field of Classification Search .................. 375/354, 375/355, 371, 373, 375, 376, 348
See application file for complete search history.

(56) References Cited

U.S. PATENT DOCUMENTS

| | | | | |
|---|---|---|---|---|
| 5,115,454 A | * | 5/1992 | Kucar | 375/321 |
| 5,875,218 A | * | 2/1999 | Barham et al. | 375/376 |
| 7,945,805 B2 | * | 5/2011 | Baumgartner et al. | 713/501 |
| 2003/0123594 A1 | * | 7/2003 | Glenn et al. | 375/373 |
| 2008/0112521 A1 | * | 5/2008 | Schmatz et al. | 375/355 |

* cited by examiner

*Primary Examiner* — Jaison Joseph
(74) *Attorney, Agent, or Firm* — Law Office of Gerald Maliszewski; Gerald Maliszewski

(57) ABSTRACT

An inter-symbol interference (ISI) pattern-weighted early-late phase detector is provided. An I clock and a function-controlled oscillation cycle phase delay Q clock are generated. The I clock frequency is divided by n, creating a reference clock. A serial data stream is sequentially sampled with the I clock, and with the function-controlled varied phase delay Q clock, creating digital I-bit and varied phase delay Q-bit values, respectively. The values are segmented into n-bit digital words. I clock phase corrections are identified and a modulation factor is determined in response to comparing varied phase delay Q-bit values with I-bit values. Also identified are bit sequence patterns associated with each I-bit value. Each I-bit value is weighted in response to the identified bit sequence pattern and the identified I clock phase correction. The modulation factor is applied to the weighted average, and I and Q clock phase error signals are generated.

16 Claims, 12 Drawing Sheets

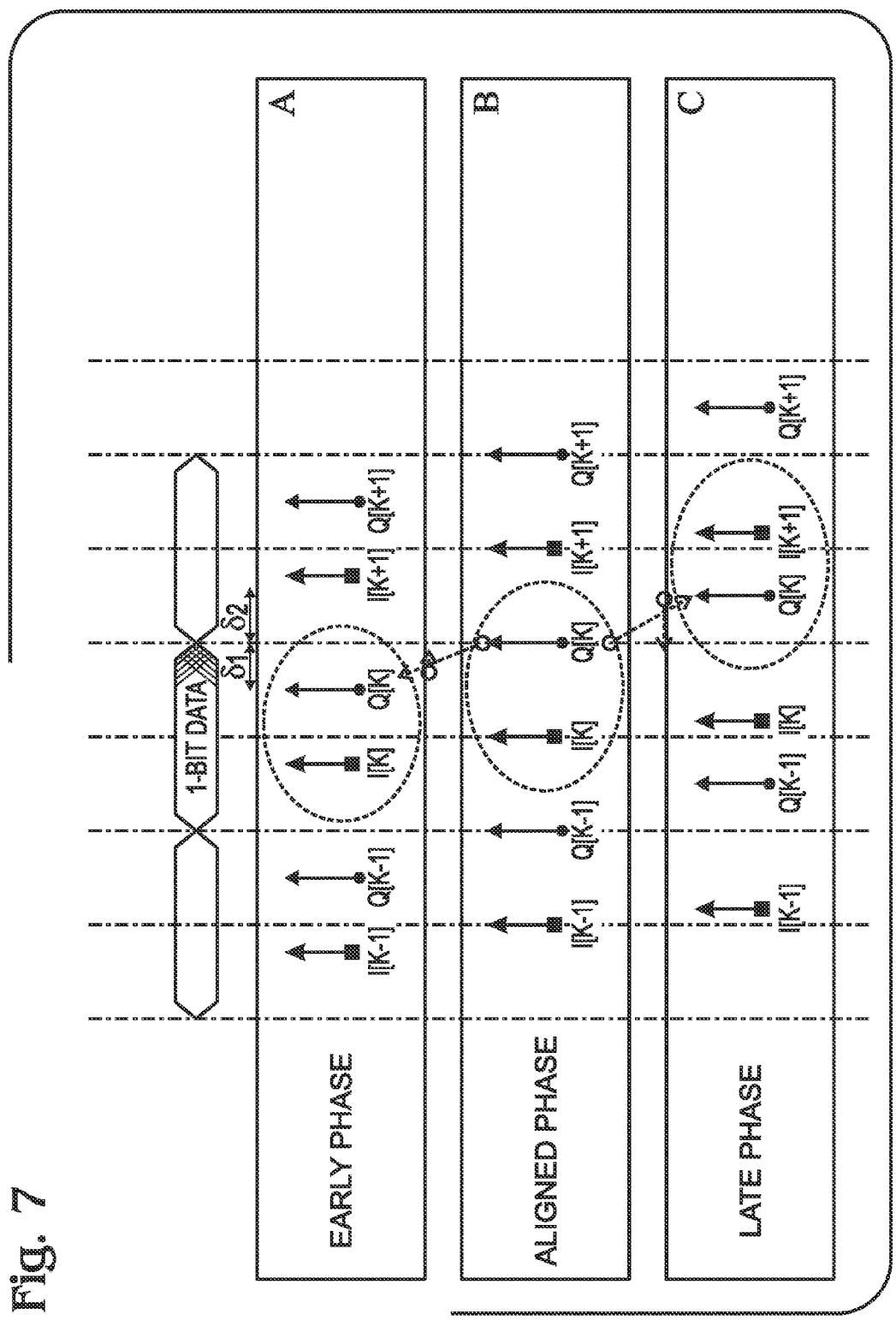

ISI PATTERN-WEIGHTED EARLY-LATE PHASE DETECTOR WITH FUNCTION-CONTROLLED OSCILLATION JITTER TRACKING

RELATED APPLICATIONS

This application is a continuation-in-part of a pending application entitled, ISI PATTERN-WEIGHTED EARLY-LATE PHASE DETECTOR WITH JITTER CORRECTION, invented by Viet Do et al., Ser. No. 12/539,516, filed Aug. 11, 2009;

which is a continuation-in-part of a pending application entitled, CLOCK AND DATA RECOVERY ISI PATTERN-WEIGHTED EARLY-LATE PHASE DETECTOR, invented by Viet Do et al., Ser. No. 12/507,034, filed Jul. 21, 2009;

which is a continuation-in-part of a pending application entitled, SINGLE CLOCK CYCLE FIRST ORDER LIMITED ACCUMULATOR FOR SUPPLYING WEIGHTED CORRECTIONS, invented by Do et al., Ser. No. 12/399,861, filed Mar. 6, 2009;

which is a continuation-in-part of a pending application entitled, FLEXIBLE ACCUMULATOR FOR RATIONAL DIVISION, invented by Do et al., Ser. No. 11/954,325, filed Dec. 12, 2007. These applications are incorporated herein by reference.

BACKGROUND OF THE INVENTION

1. Field of the Invention

This invention generally relates to signal phase detection and tracking and, more particularly, to a system and method to optimize an early/late phase detector by statistically averaging phase error jitter.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences.

However, conditional probability density functions can be defined for the three cases mentioned above. Namely, probability density functions can be defined for the cases where there are zero neighboring ones, only one neighboring one, and two neighboring ones.

The degree of dispersion exhibited by a channel, and hence the separation of the conditional probability density functions, varies in response to a number of fixed and variable factors. Effective dispersion mitigation techniques must therefore be optimized to the channel and somewhat adaptive to changes in the channel due to aging, temperature changes, reconfiguration, and other possible influences.

The above-mentioned problems are compounded if the receiver must recover the clock from the incoming data stream. That is, ISI on the received data may cause the phase detector to adjust the phase in the wrong direction if all possible ISI patterns are treated equally. Clock jitter results from the inability of a phase detector to properly lock or track phase, which becomes another source of increased bit error rate (BER).

If the bit value decision process could be made using the knowledge of the decision made on the preceding decoded bit, or with a measurement of preceding and subsequent decoded bits, then the corresponding probability density function could be selected to make a more accurate decision on the current bit decision. Such a process would require that the bits be converted from analog to digital information. However, it is not practical to perform an analog-to-digital (A/D) conversion at high serial stream data rates.

Another problem is jitter in the received data, which randomly shifts the rising and falling edges of the data along the time axis, making the ideal sampling time difficult to determine. The jitter may be a result of channel or transmission line degradations for example. One of the primary non-linearities associated with a digital phase detector comes from untracked input jitter distribution.

Conventionally, an early-late phase detector uses two clocks, an I-clock and a Q-clock, 90 degree apart in phase. The fixed phase between I-clock and Q-lock assumes that there is low input jitter, so the jitter's effect can be ignored. Ideally however, the phase difference between I-clock and Q-clock should track the jitter to minimize BER.

Further, there is a latency associated with processing of digital signals. Since the latency of a digital phase detector and the feedback loop used in a clock and data recovery (CDR) device determines the performance of CDR locking, tracking, and jitter, the feedback design must keep the latency as low as possible. The inherent latency of conventional digital circuitry limits the use of purely digital oscillator circuitry to relatively low frequencies.

It would be advantageous if phase detector signal tracking could be improved using ISI pattern weighting and jitter tracking. It would be advantageous if the pattern weighting and jitter tracking could be performed in the digital domain to save power.

SUMMARY OF THE INVENTION

Disclosed herein is a phase detector that weights data sequence patterns, to mitigate against the effects of inter-symbol interference (ISI) in received data. Multiple data patterns or sequences are detected and assigned different ISI weights, which are used by the phase detector to adjust the recovered clock phase. ISI patterns that have a lower probability of being correct are assigned with less weight, and vice versa. To address uncertainty in the rising edge and falling edges (jitter) in the received signal, the jitter is tracked and the I-clock and Q-clock of the phase detector are offset to optimize performance.

When a clock and data recovery unit (CDR) is in the tracking mode, both jitter and ISI can occur together, between two back-to-back data bits or in the Horizontal Eye Closure Zone (HEC Zone). Since the ISI is more concentrated in the center of HEC Zone than the jitter, moving the Q-clock along the HEC Zone can increase the chance that the Q-data is being sampled close to the jitter edge. Therefore, the jitter performance is enhanced. This is the principal of Timing Offset Generation (TOG).

This invention enables the optimal design of statistical averaging of phase error by using Timing Offset Generation. The architecture and implementation of TOG can enhance jitter performance with a minimum latency in the CDR feedback loop, which is an important consideration in operating a digital PLL.

Accordingly, a method is provided function-controlled phase oscillation tracking jitter in a recovered clock signal using an ISI pattern-weighted early-late phase detector. The method receives an electromagnetic waveform representing an analog serial data stream, and generates an I clock and Q clock having a function-controlled oscillation cycle phase delay with respect to the I clock. The I clock frequency is divided by n, creating a reference clock. The serial data stream is sequentially sampled with the I clock, creating digital I-bit values. Further, the serial data stream is sequentially sampled with a Q clock having the function-controlled oscillation cycle phase delay, creating varied phase delay digital Q-bit values.

The I-bit values are segmented into n-bit digital words, the varied phase delay Q-bit values are segmented into n-bit digital words. In response to analyzing the I-bit values and the varied phase delay Q-bit values, an I clock phase correction is identified. In response to comparing varied phase delay Q-bit values with I-bit values, a modulation factor is determined. Bit sequence patterns are identified associated with each I-bit value. Each I-bit value is weighted in response to the identified bit sequence pattern and the identified I clock phase correction. The weighted I-bit values are averaged for each n-bit digital word. The modulation factor is applied to the weighted I-bit value averages, generating digital I and Q phase error signals, and in response to the I and Q phase error signals, electromagnetic signals are created representing the I and function-controlled oscillation cycle phase delay Q clocks, modified in phase.

In one aspect, the sequential sampling of the serial data stream with the function-controlled oscillation cycle phase delay Q clock includes generating a Q clock that oscillates between a value having a phase delay of (X−f(d)) and a value having a phase delay of (X+f(d)), where X is the phase delay of the fixed delay Q clock with respect to the I clock, and where f(d) is a function with a variable d. Further, generating the Q clock that oscillates includes generating a Q clock with a rate of change controlled by the variable d.

In another aspect, creating I clock and function-controlled oscillation cycle phase delay Q clock, modified in phase in response to the I and Q phase error signals, includes modifying the I and function-controlled oscillation cycle phase delay Q clock at time t1. Then, identifying the I clock phase correction in response to analyzing the I-bit values and the varied phase delay Q-bit values includes: waiting a time delay t2 from t1 (t1+t2=t3), where t2 is a delay associated with sampling the serial data stream and creating the digital I-bit values; and, beginning the analysis of I-bit and varied phase delay Q-bit values associated with the modified I clock and modified function-controlled oscillation cycle phase delay Q clock values at time t3.

Additional details of the above-described method and a system for system for function-controlled phase oscillation tracking jitter in a recovered clock signal using an ISI pattern-weighted early-late phase detector are presented below.

BRIEF DESCRIPTION OF THE DRAWINGS

FIG. 7 is a diagram illustrating a process for identifying secondary phase correction types associated with a less than fixed phase delay Q clock.

DETAILED DESCRIPTION

Figure 1:
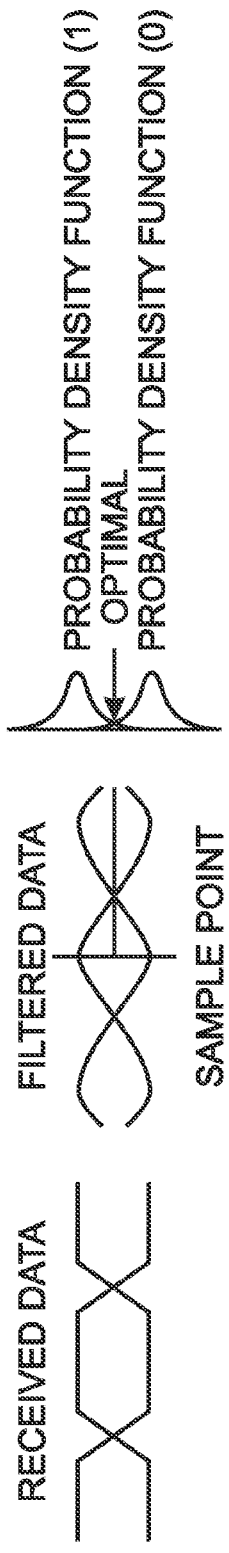
FIG. 1 is a diagram illustrating a signal recovered from a binary symmetric, non-dispersive channel in the presence of noise (prior art).
Figure 2:
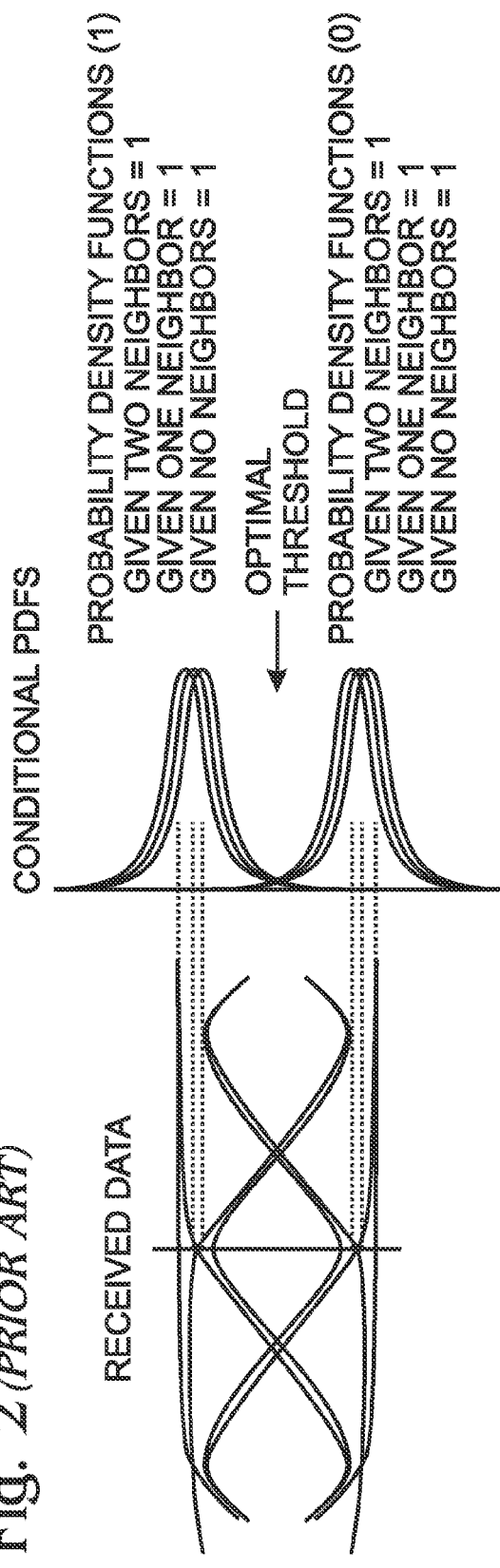
FIG. 2 is a diagram illustrating received waveforms that are distorted in response to the inter-symbol interference resulting from energy dispersion (prior art).
Figure 3:
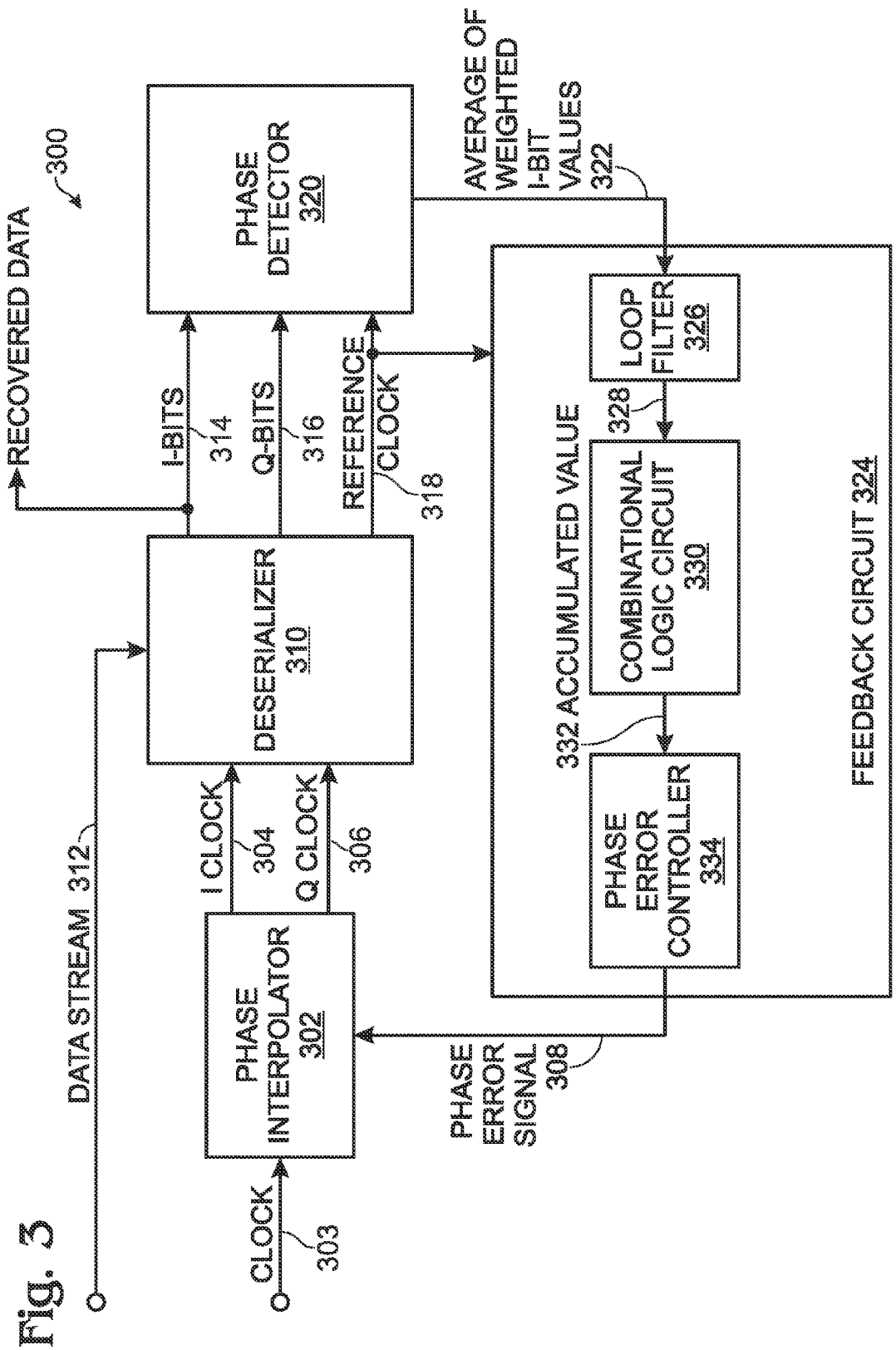
FIG. 3 is a schematic block diagram of a clock and data recovery (CDR) device with a system for the acquisition and tracking of a clock signal using an inter-symbol interference (ISI) pattern-weighted early-late phase detector.

FIG. 3 is a schematic block diagram of a clock and data recovery (CDR) device with a system for the guaranteed acquisition and tracking of a clock signal using an inter-symbol interference (ISI) pattern-weighted early-late phase detector. The system 300 comprises a phase interpolator 302 having an input on line 303 to accept a fixed frequency clock, an output on line 304 to supply an I clock signal, an output on line 306 to supply a Q clock signal having a fixed delay with respect to the I clock signal, and an input an input on line 308 to accept a digital phase error signal. The I clock has the same frequency as the clock on line 303, but the frequency of the I (and Q) clock varies in response to the phase error signal. In one aspect, the phase interpolator 302 generates a Q clock signal that is delayed 90 degrees in phase from the I clock signal. However, the system is not necessarily limited to this value. Neither is the system limited to the Q clock having a fixed phase relationship with the I clock.

A deserializer 310 has an input on line 312 to accept an analog serial data stream, an input on line 304 to accept the I clock, and an input on line 306 to accept the Q clock. The deserializer 310 has an output on line 314 to supply n-bit digital words of I-bit values generated by sampling the serial data stream with the I clock. The output on line 314 is recovered data, which is used by other circuitry, not shown. The deserializer 310 has an output on line 316 to supply n-bit words of Q-bit values generated by sampling the serial data stream with the Q clock. The deserializer 310 also has an output on line 318 to supply a reference clock signal equal to the I clock frequency divided by n.

An early-late phase detector 320 has an input on line 314 to accept the I-bit values, an input on line 316 to accept the Q-bit values, and an input on line 318 to supply the reference clock. In response to analyzing the I-bit and Q-bit values, detector 320 identifies an I clock phase correction. The detector 320 also identifies bit sequence patterns associated with each I-bit value, and weights each I-bit value in response to the identified bit sequence pattern and the identified I clock phase correction. The detector 320 has an output on line 322 to supply a digital average of the weighted I-bit values for each n-bit digital word.

A feedback circuit 324 is connected between the phase detector 320 and the phase interpolator 302. The feedback circuit 324 includes a digital loop filter 326 with an input on line 322 to accept the average of the weighted I-bit values for each n-bit digital word, and an output on line 328 to supply a filtered value. The system 300 is enabled using a wide range of conventional loop filters. The system is not limited to any particular kind of loop filter design, although a design that minimizes latency is typically preferred. The loop filter 326 feeds combinational logic circuitry 330, which is capable of a first order accumulation of error in a single clock cycle. The accumulated value is supplied on line 332. Details of the combination logic circuit are provided in parent application Ser. No. 12/399,861, which is incorporated herein by reference. A phase error controller 334 accepts the accumulated value and supplies the phase error signal on line 308.

In one aspect, the phase interpolator 302 recognizes a normalized number associated with no change in the I clock phase, and changes the I clock phase by a magnitude responsive to the difference between the phase error signal and the normalized number.

The deserializer 310 accepts the analog serial data stream via a channel on line 312 that can be identified as having a response characteristic. The three typically response characteristics are known as pre-cursor, post cursor, and symmetrical. For example, telecom networks typically transmit relatively large amplitude signals that gradually decay as a function of channel length. Such a network is typically characterized as having a post-cursor response. Alternately, datacom networks may have a channel response that is characterized as symmetric.

The weighting of bit sequence patterns varies for different channel response characteristics. That is, the detector 320 assigns a weight to bit sequence patterns in response to an identified channel characteristic. In one aspect, the channel characteristics are preconfigured at initialization. The detector 320 applies weight to bit sequence patterns in response to criteria such as the number of bits preceding a current bit value, the number of bits following the current bit value, a bit sequence length, or combinations of the above-mentioned criteria.

Figure 4:
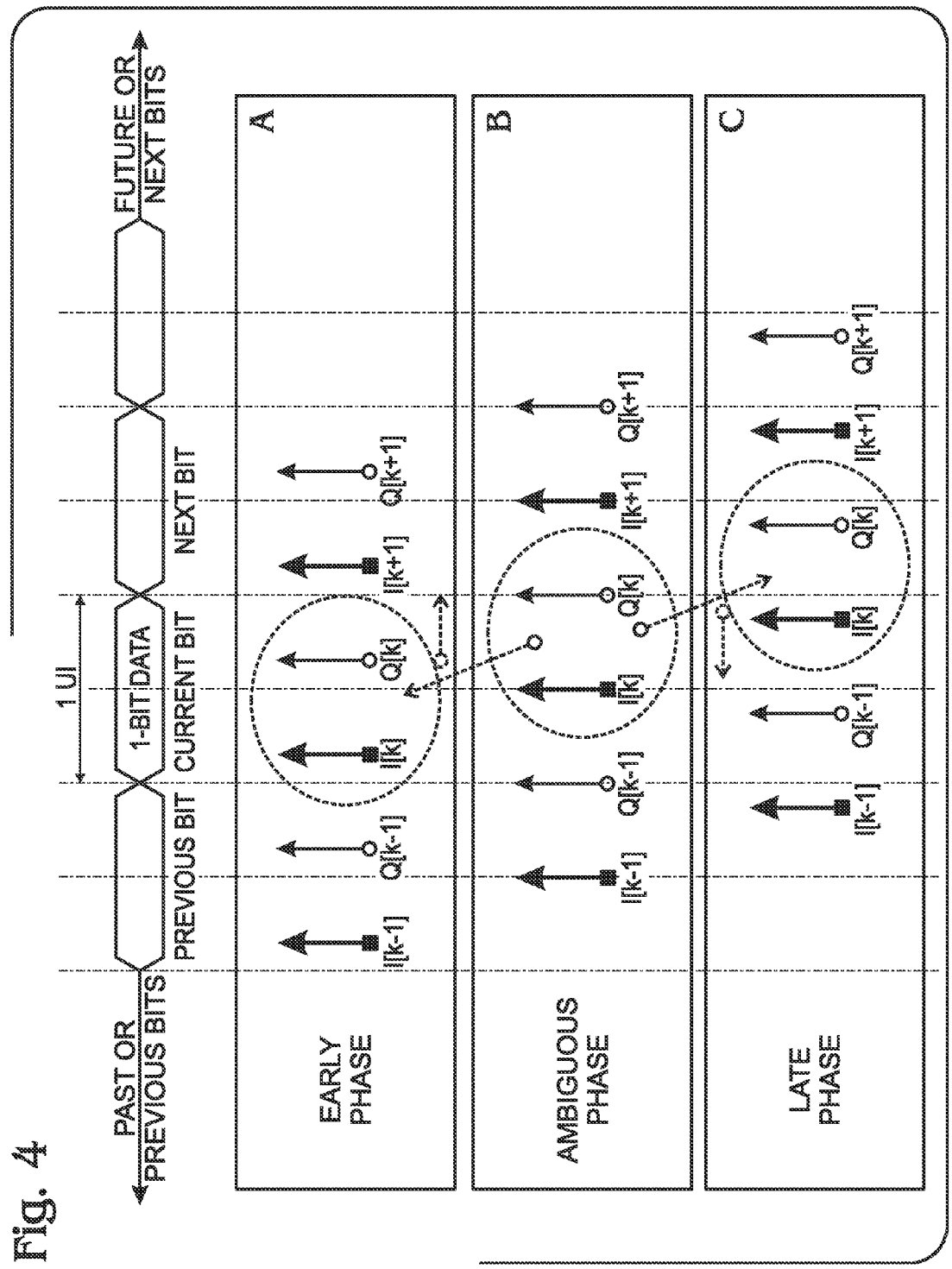
FIG. 4 is a diagram illustrating a process for identifying phase corrections.

FIG. 4 is a diagram illustrating a process for identifying phase corrections. The detector identifies one of three types of phase correction types: early phase, late phase, and ambiguous phase. The detector assigns a multiplication factor to each phase correction type, where the ambiguous phase has a multiplication factor of 0, the early phase has a first number multiplication factor with a first sign polarity (e.g. +1), and the late phase has the first number multiplication factor with a second sign polarity, opposite to the first sign polarity (e.g., −1).

As noted above, the detector applies a weight number to identified bit sequence patterns, where a higher weight number indicates a greater degree of confidence in the identified I-bit value. The detector multiplies the weight number by the identified phase correction multiplication factor.

In Section A the detector identifies an early phase correction since a previous I-bit value (DI(k−1)) equals a previous Q-bit value (DQ(k−1)), and the previous Q-bit value (DQ(k−1)) does not equal a current I-bit value (DI(k)).

In Section B the detector identifies an ambiguous phase correction since a previous I-bit value (DI(k−1)) equals a previous Q-bit value (DQ(k−1)), and the previous Q-bit value (DQ(k−1)) equals a current I-bit value (DI(k)). Although the previous Q-bit value (DQ(k−1)) is shown at the eye closure point, it is delayed just enough to be the same value as the (DI(k)) value. Alternately, an ambiguous phase is determined if the previous I-bit value (DI(k−1)) equals the current I-bit value (DQ(k)), and the current I-bit value (DI(k)) does not equal the previous Q-bit value (DQ(k−1)).

In Section C the detector identifies a late phase correction since a previous I-bit value (DI(k−1)) does not equal a previous Q-bit value (DQ(k−1)), and the previous Q-bit value (DQ(k−1)) equals a current I-bit value (DI(k)).

Figure 5:
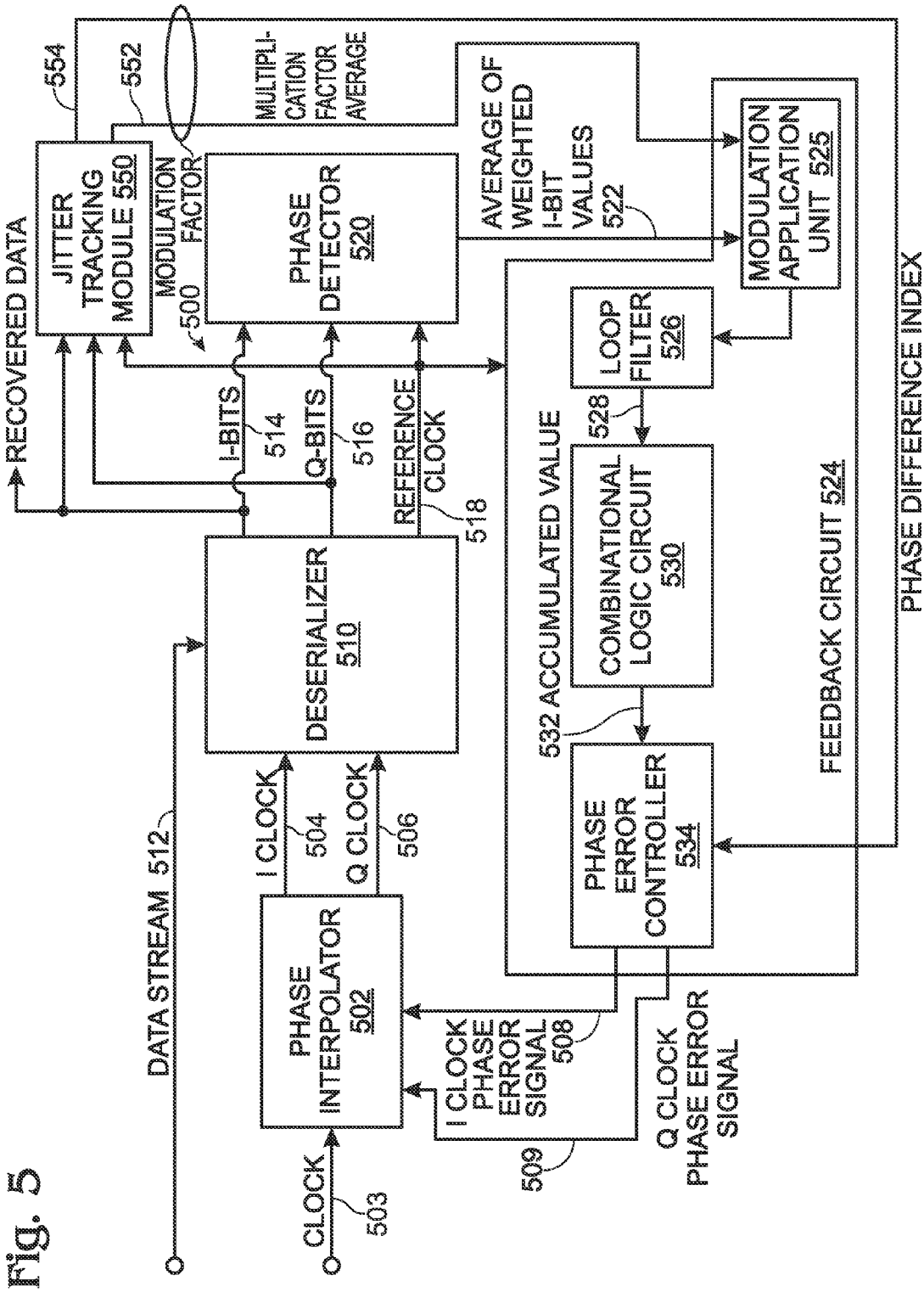
FIG. 5 is a schematic block diagram of a system for function-controlled phase oscillation tracking jitter in a recovered clock signal using an ISI pattern-weighted early-late phase detector.

FIG. 5 is a schematic block diagram of a system for function-controlled phase oscillation tracking jitter in a recovered clock signal using an ISI pattern-weighted early-late phase detector. The system of FIG. 5 builds upon the system described above in FIGS. 3 and 4 with the addition of a jitter tracking module that modulates the average of the weighted I-bit values using data sampled with a function-controlled phase oscillating Q clock.

A phase interpolator 502 has an output on line 504 to supply an I clock signal, and an output on line 506 to supply a function-controlled oscillation cycle phase delay Q clock signal, with respect to the I clock signal. In one aspect, the phase interpolator 502 supplies a Q clock signal with an average phase delay of about 90 degrees with respect to the I clock signal phase. The phase interpolator 502 has an input on line 508 to accept a digital I phase error signals and an input on line 509 to accept a digital Q phase error signal. In one aspect, the phase interpolator is an analog circuit.

A deserializer 510 has an input on line 512 to accept an analog serial data stream, an input on line 504 to accept the I clock, and an input on line 506 the function-controlled oscillation cycle phase delay Q clock. The deserializer has an output on line 514 to supply n-bit digital words of I-bit values generated by sampling the serial data stream with the I clock. The output on line 514 is recovered data, which is used by other circuitry, not shown. On line 516 the deserializer supplies n-bit digital words of varied phase delay Q-bit values generated by sampling the serial data stream with the function-controlled oscillation cycle phase delay Q clock. A reference clock signal is supplied on line 518 that is equal to the I clock frequency divided by n.

An early-late phase detector 520 has an input on line 514 to accept the I-bit values, an input on line 516 to accept the varied phase delay Q-bit values, and an input on line 518 to accept the reference clock. In response to analyzing the I-bit and varied phase delay Q-bit values, detector 520 identifies an I clock phase correction. The detector 520 also identifies bit sequence patterns associated with each I-bit value, and weights each I-bit value in response to the identified bit sequence pattern and the identified I clock phase correction.

The detector 520 has an output on line 522 to supply a digital average of the weighted I-bit values for each n-bit digital word.

A jitter tracking module 550 has an input on line 514 to accept the I-bit values and an input on line 516 to accept the varied phase delay Q-bit values. In response to comparing the varied phase delay Q-bit values to the I-bit values, the jitter tracking module supplies a modulation factor on line 552. The jitter tracking module 550 may be implemented in hardware, software, or a combination of hardware and software. The software components of the jitter tracking module, if any, would be enabled by a microprocessor executing software instructions stored in a computer-readable memory (not shown).

A feedback circuit 524 is connected between the phase detector 520 and the phase interpolator 502. The feedback circuit 524 includes a modulation application unit 525 to accept the modulation factor and the average of the weighted I-bits values. There are a number of mathematical means known in the art to use the modulation factor to influence the weighted I-bit values.

After the application of the modulation factor to the average of the weighted I-bit values, the modulated average is supplied a digital loop filter 526, which has an output on line 528 to supply a filtered value. The system 500 is enabled using a wide range of conventional loop filters. The system is not limited to any particular kind of loop filter design, although a design that minimizes latency is typically preferred. The loop filter 526 feeds combinational logic circuitry 530, which is capable of a first order accumulation of error in a single clock cycle. The accumulated value is supplied on line 532. Details of the combination logic circuit are provided in parent application Ser. No. 12/399,861, which is incorporated herein by reference.

The phase error controller 534 accepts the accumulated value on line 532. In one aspect, the jitter tracking module 550 supplies a phase difference index component on line 554 that is associated with the modulation factor. Alternately stated, the modulation factor may be understood as comprising a signed multiplication factor average on line 552 and a phase difference index on line 554. The phase difference index is a measurement of the difference between the varied phase delay Q clock and the I clock. The multiplication factor average is an average of the multiplication factors, as calculated over a reference clock period (n bits). In one aspect, the modulation application module 525 multiplies the weighted I-bit value by the multiplication factor average. The accumulated value on line 532 is convoluted (processed) by the signals on lines 522 and 552, through modules 525, 526, and 530.

The phase difference index is received by the phase error controller 534, along with the multiplication factor average (after processing by units 525, 526, and 530). The phase error controller 534 supplies the I and Q phase error signals on line 508 and 509, respectively. In one aspect, the phase error controller 534 combines (or sum) the phase difference index signal on line 554 with the accumulated value on line 532. For example, the I clock phase error signal on line 508 may be the sum of the current I clock phase error signal, the accumulated value, and the phase difference index. Likewise, the Q clock phase error signal on line 509 may be the sum of the current Q clock phase error signal, the accumulated value, and the phase difference index. The phase interpolator 502 accepts the I and Q phase error signals and respectively modifies the phases of the I clock and function-controlled oscillation cycle phase delay Q clock supplied on lines 504 and 506, respectively.

Figure 6:
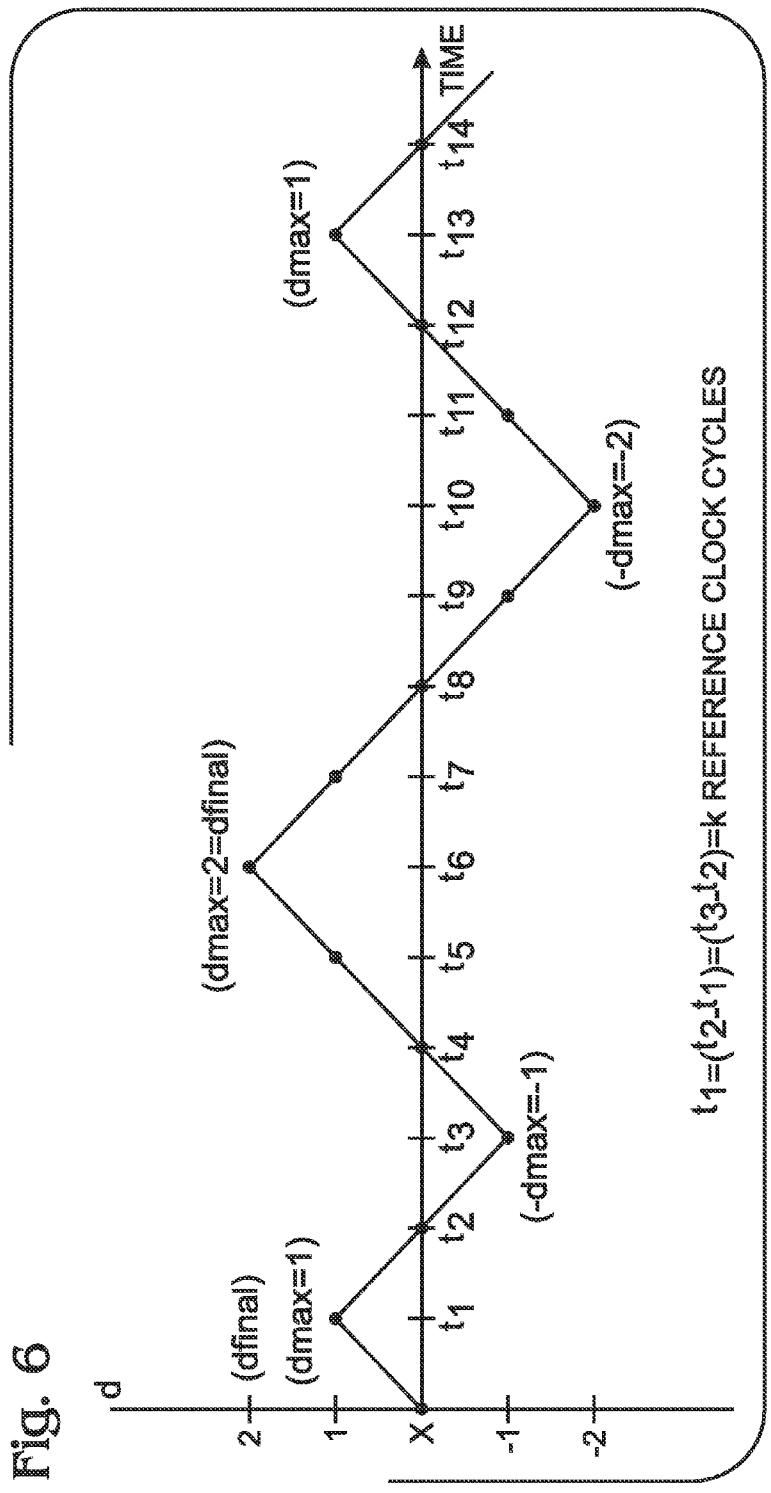
FIG. 6 is a graph depicting the function-controlled oscillation cycle phase delay Q clock with respect to time.

FIG. 6 is a graph depicting the function-controlled oscillation cycle phase delay Q clock with respect to time. Contrasting FIGS. 5 and 6, in one aspect the phase interpolator 502 generates the function-controlled oscillation cycle phase delay Q clock by generating a Q clock that oscillates between a value having a phase delay of $(X-f(d))$ and a value having a phase delay of $(X+f(d))$, where X is the phase delay of the fixed delay Q clock with respect to the I clock, and where $f(d)$ is a function with a variable d. In another aspect, the phase interpolator 502 generates a (varied delay) Q clock with a rate of change controlled by the variable d.

In a different aspect, the phase interpolator generates a function-controlled oscillation cycle phase delay Q clock having a triangular cycle delay around the value of X, with a cyclic frequency that decreases as the value of $f(d)$ approaches a maximum value (dfinal), and increases as the value of $f(d)$ approaches zero. For simplicity, FIG. 6 depicts Q clock delay variations based upon a function $f(d)=(1)(d)$, where (dfinal)=2. However, it should be understood that Q clock delay variations may be based upon more complex functions.

More explicitly, the phase interpolator 502 generates the function-controlled oscillation cycle phase delay Q clock through the following steps:

a) initializing by setting the values of d and dmax to zero;

b) incrementing the value of dmax one unit value. In FIG. 6, a unit value=1;

c) incrementing the value of d by one unit value every k reference clock cycles, until d=dmax. Note: k is a variable not limited to any particular value, and the I clock divided by n=1 reference clock cycle;

d decrementing the value of d by one unit value every k reference clock cycles, until d=−(dmax);

e) incrementing the value of d one unit value each cycle every k reference clock cycles, until d=0;

f) if dmax <dfinal, repeating Steps b) through e);

g) if dmax=dfinal, decrementing the value of dmax one unit value;

h) incrementing the value of d by one unit value every k reference clock cycles, until d=dmax;

i) decrementing the value of d by one unit value every k reference clock cycles, until d=−(dmax);

j) incrementing the value of d one unit value every k reference clock cycles, until d=0;

k) if dmax>0, repeating Steps g through j; and, l) if dmax=0, repeating Steps b through f.

In one aspect, the phase interpolator 502 modifies the I and function-controlled oscillation cycle phase delay Q clock phases at time a in response to the I and Q phase error signals on lines 508 and 509, respectively. The early-late phase detector 520 waits a time delay t2 from t1 (t1+t2=t3), where t2 is a delay associated with the deserializer sampling the serial data stream to create I-bit values. The early-late phase detector 520 begins the analysis of I-bit and varied phase delay Q-bit values associated with the modified I clock and modified function-controlled oscillation cycle phase delay Q clock values at time t3. The feedback circuit 524 supplies new I and Q phase error signals k reference clock cycles following time t3.

As noted above in the description of FIG. 3, the phase detector 520 identifies early phase, late phase, and ambiguous phase correction types, and assigns a multiplication factors. In system 500, these corrections are referred to as a primary phase correction type. The ambiguous phase has a multiplication factor of 0, the early phase has a first number multiplication factor with a first sign polarity, and the late phase has the first number multiplication factor with a second sign polarity, opposite to the first sign polarity. The primary phase correction mechanisms are described above and depicted in FIG. 4, and are not repeated here in the interest of brevity.

The jitter tracking module 550 identifies a secondary phase correction type: early phase, late phase, or ambiguous phase. The jitter tracking module 550 cross-references the secondary phase correction type to one of the following types of Q clock phase delay: fixed phase delay, less than the fixed phase delay, and greater than the fixed phase delay. As used herein, the "fixed" phase delay is the average or expected Q clock phase delay, which is typically 90 degrees. The jitter tracking module assigns a multiplication factor to each cross-referenced secondary phase correction type. As with the primary phase corrections, a multiplication factor of 0 is assigned to an ambiguous secondary phase correction type. A multiplication factor with the first sign polarity (e.g., "+") is assigned to an early secondary phase correction type, and a multiplication factor with the second sign polarity (e.g., "−") is assigned to a late secondary phase correction type. The multiplication factors are also responsive to the absolute value of the difference between the fixed phase delay Q clock and the varied phase delay Q clock. That is, the magnitude of the multiplication factor is related to the absolute value of the Q clock phase variation from the I clock.

FIG. 7 is a diagram illustrating a process for identifying secondary phase correction types associated with a less than fixed phase delay Q clock. As noted above, the fixed phase delay Q clock may be delayed about 90 degrees from the I clock, and ideally occurs at the eye closure point between bits. A multiplication factor of $1/f(j)$ is assigned to a early secondary phase correction type cross-referenced to a less than fixed phase delay Q clock, where j is an index of the function f(j), and where the values of j and f(j) both increase as the absolute value of the difference between the fixed (average) phase delay Q clock and varied phase delay Q clock increases. See Section A. A multiplication factor of $-(f(j))$ is assigned to a late secondary phase correction type cross-referenced to a less than fixed phase delay Q clock (Section C).

Figure 8:
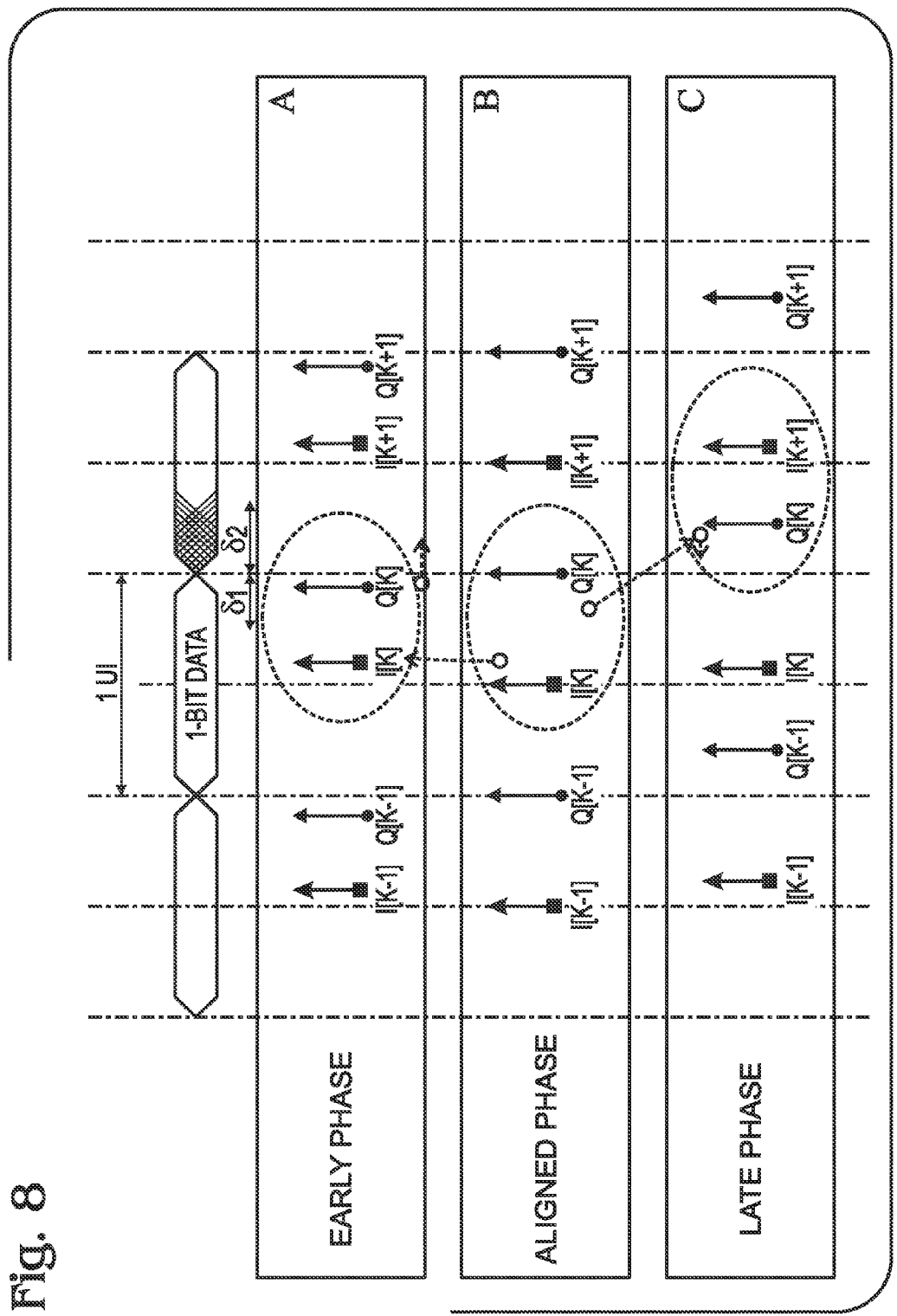
FIG. 8 is a diagram illustrating a process for identifying secondary phase correction types associated with a greater than fixed phase delay Q clock.

FIG. 8 is a diagram illustrating a process for identifying secondary phase correction types associated with a greater than fixed phase delay Q clock. A multiplication factor of $-(1/f(j))$ is assigned to a late secondary phase correction type cross-referenced to a greater than fixed phase delay Q clock. See Section A. A multiplication factor of $(f(j))$ is assigned to an early secondary phase correction type cross-referenced to a greater than fixed phase delay Q clock (Section C).

Referencing FIGS. 7 and 8, the jitter tracking module identifies an early phase correction if:
a current I-bit value (DI(k)) equals a current Q-bit value (DQ(k)); and,
the current Q-bit value (DQ(k)) does not equal a subsequent I-bit value (DI(k+1)).

The jitter tracking module identifies an ambiguous phase correction if:
a current I-bit value (DI(k)) equals a current Q-bit value (DQ(k));
the current Q-bit value (DQ(k)) equals a subsequent I-bit value (DI(k+1)); or if
a current I-bit value (DI(k)) does not equal a current Q-bit value (DQ(k)); and,
the current I-bit value (DI(k)) equals the subsequent I-bit value (DI(k+1)).

The jitter tracking module identifies a late phase correction if:
a current I-bit value (DI(k)) equals a current Q-bit value (DQ(k)); and,
the current Q-bit value (DQ(k)) equals a subsequent I-bit value (DI(k+1)).

Functional Description

Figure 9:
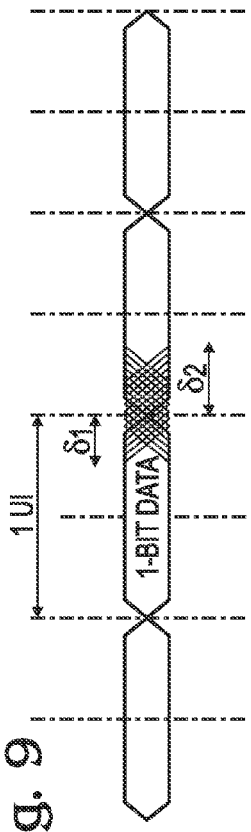
FIG. 9 is a diagram depicting a horizontal eye closure zone that is associated with the Q clock variation in phase.

FIG. 9 is a diagram depicting a horizontal eye closure zone that is associated with the Q clock variation in phase. To track the input jitter, the Q clock sweeps the horizontal eye closure zone, with the boundaries ($\delta_{1(max)}, \delta_{2(max)}$), to detect and adjust for the effect of input jitter. The boundary zone ($\delta_{1(max)}, \delta_{2(max)}$) can be determined by eye monitoring or by using predetermined programmable settings. The principal of timing offset generation is to sweep the Q clock phase while checking for the agreement between I clock and Q clock data. If the data is in agreement, then the phase change can be kept small. Otherwise the phase change needs to increase. Referring again to FIGS. 7 and 8, a generic function may be used to control the phase change, e.g., $f[j]=2j+1$. Therefore, a larger phase change can be made with the multiplication factor of $f[j]$ than with the multiplication factor of $(1/f[j])$. The value of j increases as the sampling Q clock phase varies from the fixed phase delay. For example, j may be equal to 1 when the Q clock phase difference is 1 degree. Then, the modulation factor f(1) equal 3, because the $f(1)=2\times1+1=3$. When the phase difference index j is 2 (in this example, 2 degrees), then the modulation factor equal 5, because the $f(2)=2\times2+1=5$. In general, a unit of j can be any value. Further, jitter is tracked by noting whether the Q clock phase difference is less than the fixed delay, or greater than the fixed phase delay.

To continue the example, the fixed (average) phase delay may be 90 degrees (the Q clock is delayed 90 degrees from the I clock). In an early phase condition where the Q clock is known to be less than the fixed phase delay (e.g., 90 degrees), the current I and Q-bit values agree and the current Q-bit value is different from the next I-bit value as expected, see FIG. 7. Therefore; only need a small right shift is needed for the Q clock (e.g. 1/f[j]). In an ambiguous phase there is no change. In a late phase where the Q clock is known to be greater than the fixed phase delay, the current I and Q-bit values do not agree. Moreover, the current Q-bit value is different from next I-bit value, which is unexpected. These conditions indicate that Q clock is far away from 1 clock and a large left-shift is needed to bring back the Q clock (e.g., −f[j]).

Figure 10:
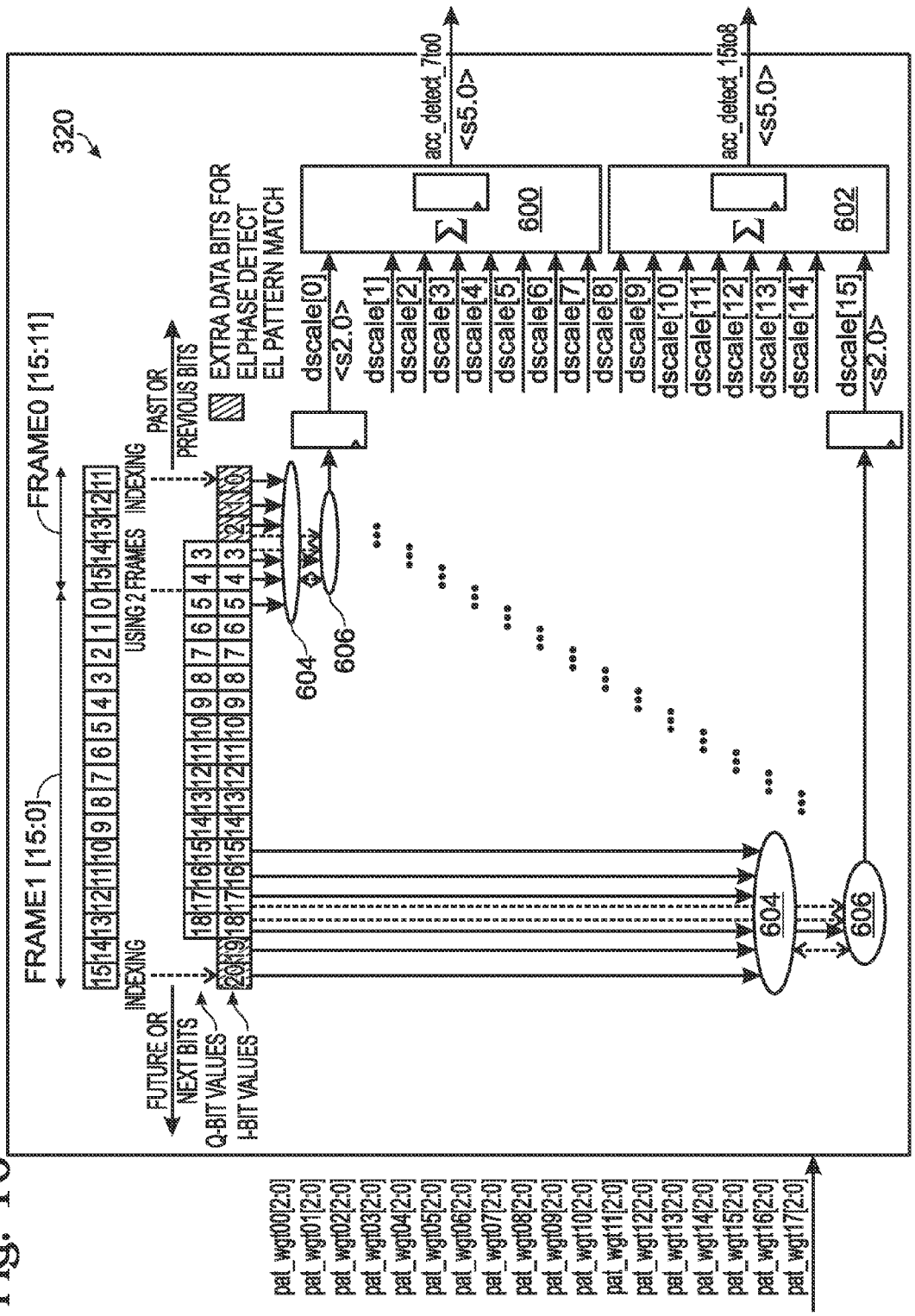
FIG. 10 is a schematic block diagram depicting a detailed example of the phase detector of FIGS. 3 and 5.

FIG. 10 is a schematic block diagram depicting a detailed example of the phase detector of FIGS. 3 and 5. In this example n=16, so that each digital word (frame) has 16 bits. The phase detector searches for patterns in the I-bit values and applies weights. The phase detector compares I-bit and Q-bit values (sampled with the function-controlled oscillation cycle phase delay Q clock) to determine a phase correction (multiplier) and multiplies the weight by the multiplier. Weighted corrections for bits 0 through 7 are averaged (summed) together in summing device 600, and weighted corrections for bits 8-15 are summed in summing device 602. Pattern matching and weight assignment are associated with reference designator 604, and phase detection is associated with reference designator 606.

Figure 11:
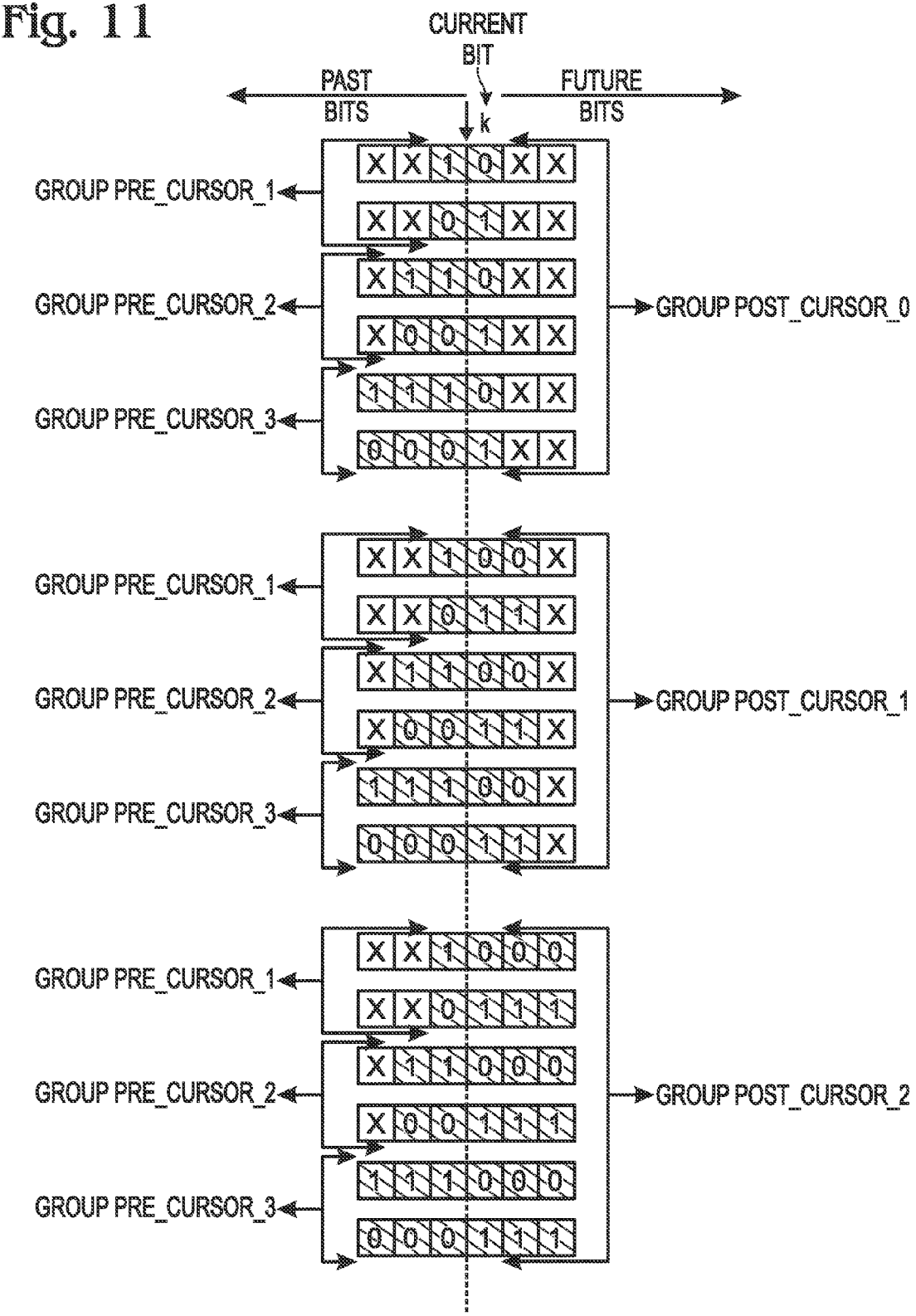
FIG. 11 is a diagram depicting an exemplary ISI pattern weighting scheme for a post-cursor channel.

FIG. 11 is a diagram depicting an exemplary ISI pattern weighting scheme for a post-cursor channel, 18 data sequence patterns are shown arranged from high ISI (low weighting) to low ISI (high weighting). Patterns in the post_cursor_0 group have a lower weighting the patterns in the post_cursor_1 group. Likewise, the patterns in the post_cursor_1 group have a lower weighting the patterns in the post_cursor_2 group. Inside each post_cursor group, the pre_cursor_1 group (with 1 past bit) has a lower weighting the pre_cursor_2 group (with 2 past bits). Likewise, the pre_cursor_2 group has a lower weighting the pre_cursor_3 group (with 3 past bits).

As shown, a maximum of 6 bits are used in a pattern match. However, patterns with a greater number of bits may also be used. Different weightings may be applied to these same patterns if the channel is identified as having a pre-cursor or symmetrical channel response characteristic.

To enhance the CDR performance, the CDR must not only be able to track the large input jitter but also feedback with low latency. In the system of FIG. 5, the modulation application unit uses a Timing Offset Generation (TOG) algorithm without a latency penalty. The modulation application unit detects the total phase error from the early-late phase detector (average of weighted I-bit values) to make decisions as to whether to increase or decrease the TOG gain (multiplication factor average). The multiplication factor average may be separated into most significant bit (MSB) and least significant bit (LSB) portions. In one aspect, the MSBs are added into the total phase error without latency cost. In another aspect, the LSBs are concatenated into the total phase error without latency cost. At the cost of 1 cycle of latency, the concatenate operation can be replaced with multiplication operation for quicker loop back effect.

Figure 12A:
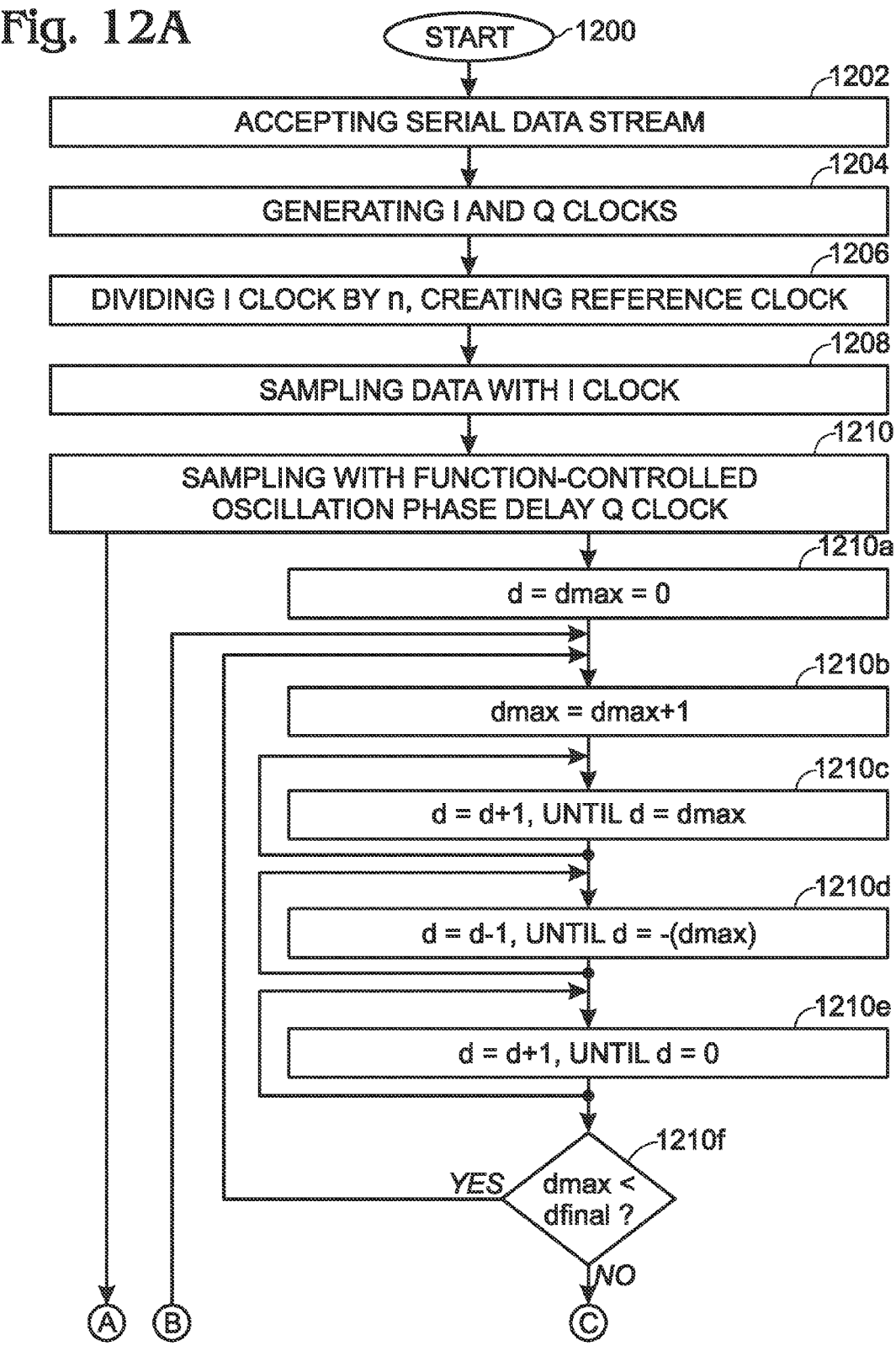
FIGS. 12A through 12C are flowcharts illustrating a method for tracking jitter in a recovered clock signal using an ISI pattern-weighted early-late phase detector.
Figure 12B:
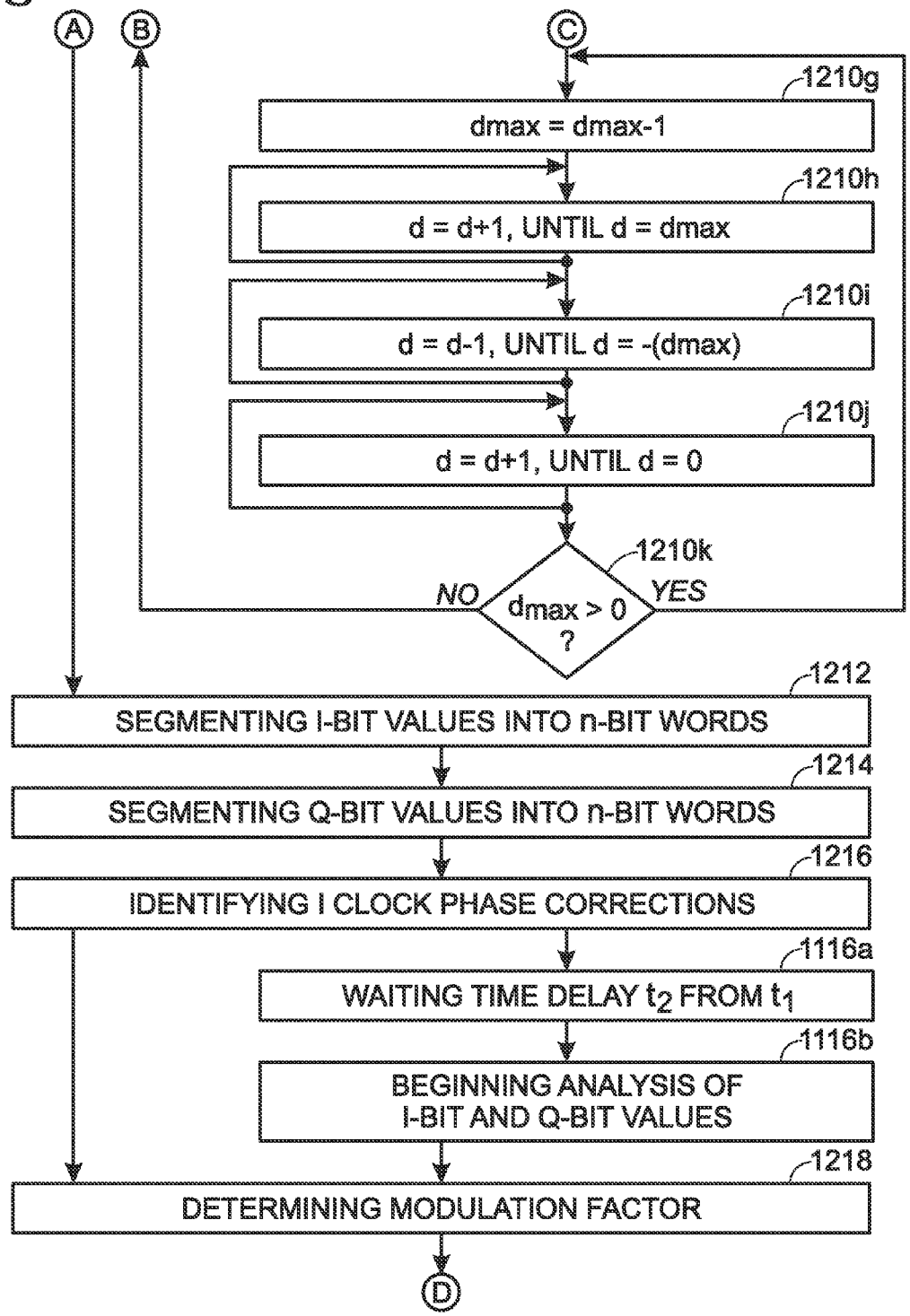
Figure 12C:
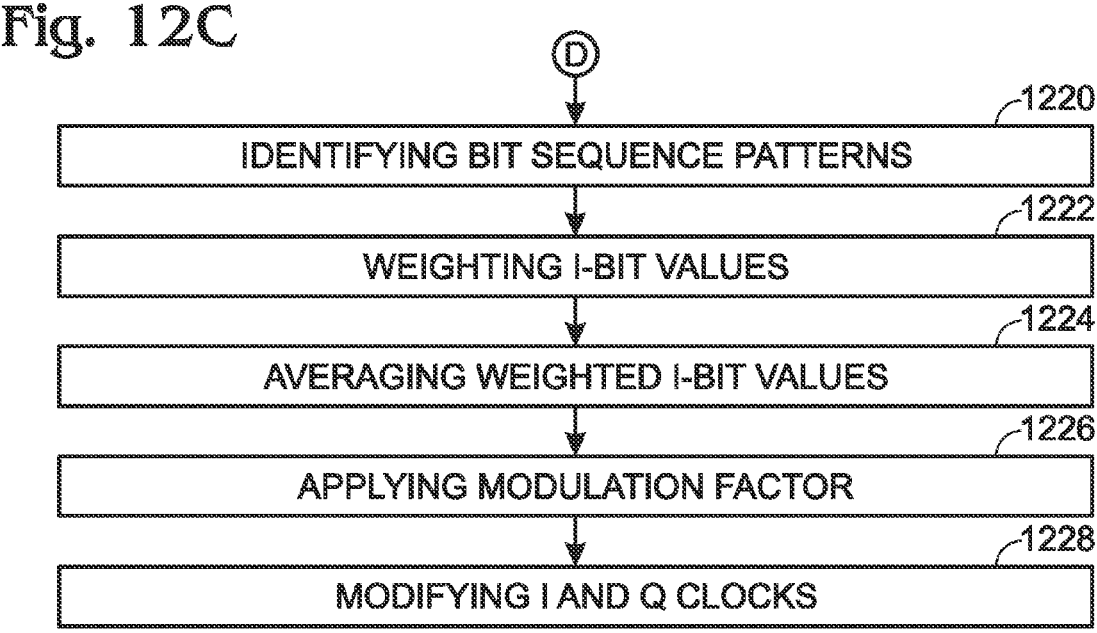

FIGS. 12A through 12C are flowcharts illustrating a method for function-controlled phase oscillation tracking jitter in a recovered clock signal using an ISI pattern-weighted early-late phase detector. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1200.

Step 1202 receives an electromagnetic waveform representing an analog serial data stream. Step 1204 generates an I clock, and a Q clock having a function-controlled oscillation cycle phase delay with respect to the I clock. In one aspect, a Q clock is generated that has an average phase delay of about 90 degrees with respect to the I clock phase. Step 1206 divides the I clock frequency by n, creating a reference clock. Step 1208 sequentially samples the serial data stream with the I clock, creating digital I-bit values. Step 1210 sequentially samples the serial data stream with the Q clock having the function-controlled oscillation cycle phase delay, creating varied delay digital Q-bit values. Step 1212 segments the I-bit values into n-bit digital words, and Step 1214 segments the varied phase delay Q-bit values into n-bit digital words. In response to analyzing the I-bit values and varied phase delay Q-bit values, Step 1216 identifies an I clock phase correction. In response to comparing varied phase delay Q-bit values to I-bit values, Step 1218 determines a modulation factor.

Step 1220 identifies bit sequence patterns associated with each I-bit value. Step 1222 weights each I-bit value in response to the identified bit sequence pattern and the identified I clock phase correction. Step 1224 averages the weighted I-bit values for each n-bit digital word. Step 1226 applies the modulation factor to the weighted I-bit value averages, generating digital I and Q phase error signals. As noted above, the modulation factor may include the components of a phase difference index and a multiplication factor average. For example, Step 1226 may multiply the weighted I-bit value by the multiplication factor average. In response to the I and Q phase error signals, Step 1228 creates electromagnetic signals representing the I clock and the function-controlled oscillation cycle phase delay Q clock, modified in phase.

In one aspect, sequentially sampling the serial data stream with the function-controlled oscillation cycle phase delay Q clock (Step 1210) includes generating a Q clock that oscillates between a value having a phase delay of (X−f(d)) and a value having a phase delay of (X+f(d)), where X is the phase delay of the fixed (average) delay Q clock with respect to the I clock, and where f(d) is a function with a variable d. In another aspect, generating the oscillating Q clock in Step 1210 includes generating a Q clock with a rate of change controlled by the variable d.

In a different aspect, generating the Q clock that oscillates in Step 1210 includes generating a Q clock having a triangular cycle delay around the value of X, with a cyclic frequency that decreases as the value of f(d) approaches a maximum value (dfinal), and increases as the value of f(d) approaches zero.

More explicitly, the process of generating the Q clock that oscillates in Step 1210 includes the following substeps. Step 1210a initializes by setting the values of d and dmax to zero. Step 1210b increments the value of dmax one unit value. Step 1210c increments the value of d by one unit value every k reference clock cycles, until d=dmax. Step 1210d decrements the value of d by one unit value every k reference clock cycles, until d=−(dmax). Step 1210e increments the value of d one unit value each cycle every k reference clock cycles, until d=0. If dmax <dfinal (Step 1210f), Steps 1210b through 1210e are repeated. If dmax=dfinal, Step 1210g decrements the value of dmax one unit value. Step 1210h increments the value of d by one unit value every k reference clock cycles, until d=dmax. Step 1210i decrements the value of d by one unit value every k reference clock cycles, until d=−(dmax). Step 1210j increments the value of d one unit value every k reference clock cycles, until d=0. If dmax >0 (Step 1210k), Steps 1210g through 2110j are repeated, and if dmax=0, Steps 1210b through 1210e are repeated.

In one aspect, creating the I clock and function-controlled oscillation cycle phase delay Q clock, modified in phase in response to the I and Q phase error signals (Step 1228), includes modifying the I and function-controlled oscillation cycle phase delay Q clock at time t1. Then, identifying the I clock phase correction in response to analyzing the I-bit values and the varied phase delay Q-bit values in Step 1216 includes substeps. Step 1216a waits a time delay t2 from t1 (t1+t2=t3), where t2 is a delay associated with sampling the serial data stream and creating the digital I-bit values. Step 1216b begins the analysis of I-bit and varied phase delay Q-bit values associated with the modified I clock and modified function-controlled oscillation cycle phase delay Q clock values at time t3. Further, generating digital I and Q phase error signals in Step 1226 includes generating new I and Q phase error signals, k reference clock cycles following time t3.

A system and method have been provided for function-controlled phase oscillation tracking jitter in a recovered clock signal using an inter-symbol interference (ISI) pattern-weighted early-late phase detector. Some examples of circuitry and methodology steps have been given to illustrate the invention. However, the invention is not limited to merely these examples. Likewise, the invention has been described in the context of binary numbers. However, the invention is not limited to any particular number base. Other variations and embodiments of the invention will occur to those skilled in the art.

We claim:

1. A method for function-controlled phase oscillation tracking jitter in a recovered clock signal using an inter-symbol interference (ISI) pattern-weighted early-late phase detector, the method comprising:

receiving an electromagnetic waveform representing an analog serial data stream;

generating an I clock and Q clock having a function-controlled oscillation cycle phase delay with respect to the I clock;

dividing the I clock frequency by n, creating a reference clock;

sequentially sampling the serial data stream with the I clock, creating digital I-bit values;

sequentially sampling the serial data stream with a Q clock having the function-controlled oscillation cycle phase delay, creating varied phase delay digital Q-bit values;

segmenting the I-bit values into n-bit digital words;

segmenting the varied phase delay Q-bit values into n-bit digital words;

in response to analyzing the I-bit values and the varied phase delay Q-bit values, identifying an I clock phase correction;

in response to comparing the I-bit values and the varied phase delay Q-bit values, determining a modulation factor;

identifying bit sequence patterns associated with each I-bit value;

weighting each I-bit value in response to the identified bit sequence pattern and the identified I clock phase correction;

averaging the weighted I-bit values for each n-bit digital word;

applying the modulation factor to the weighted I-bit value averages, generating digital I and Q phase error signals; and, in response to the I and Q phase error signals, creating electromagnetic signals representing the I clock and the function-controlled oscillation cycle phase delay Q clock, modified in phase.

2. The method of claim 1 wherein generating the I clock and the function-controlled oscillation cycle phase delay Q clock includes generating a function-controlled oscillation cycle phase delay Q clock that has an average delay of about 90 degrees with respect to the I clock phase.

3. The method of claim 1 wherein sequentially sampling the serial data stream with the function-controlled oscillation cycle phase delay Q clock includes generating a Q clock that oscillates between a value having a phase delay of (X−f(d)) and a value having a phase delay of (X+f(d)), where X is the phase delay of the average delay Q clock with respect to the I clock, and where f(d) is a function with a variable d.

4. The method of claim 3 wherein generating the Q clock that oscillates includes generating a Q clock with a rate of change controlled by the variable d.

5. The method of claim 4 wherein generating the Q clock that oscillates includes generating a Q clock having a triangular cycle delay around the value of X, with a cyclic frequency that decreases as the value of f(d) approaches a maximum value (dfinal), and increases as the value of f(d) approaches zero.

6. The method of claim 4 wherein the process of generating the Q clock that oscillates includes the following steps:

a) initializing by setting the values of d and dmax to zero;

b) incrementing the value of dmax one unit value;

c) incrementing the value of d by one unit value every k reference clock cycles, until d=dmax;

d decrementing the value of d by one unit value every k reference clock cycles, until d=−(dmax);

e) incrementing the value of d one unit value each cycle every k reference clock cycles, until d=0;

f) if dmax<dfinal, repeating Steps b) through e);

g) if dmax=dfinal, decrementing the value of dmax one unit value;

h) incrementing the value of d by one unit value every k reference clock cycles, until d=dmax;

i) decrementing the value of d by one unit value every k reference clock cycles, until d=−(dmax);

j) incrementing the value of d one unit value every k reference clock cycles, until d=0;

k) if dmax >0, repeating Steps g through j; and, l) if dmax=0, repeating Steps b through f.

7. The method of claim 1 wherein creating I clock and the function-controlled oscillation cycle phase delay Q clock, modified in phase in response to the I and Q phase error signals, includes modifying the I clock and the Q clock having the function-controlled oscillation cycle phase delay at time t1;

wherein identifying the I clock phase correction in response to analyzing the I-bit values and the varied phase delay Q-bit values includes:

waiting a time delay t2 from t1 (t1+t2=t3), where t2 is a delay associated with sampling the serial data stream and creating the digital I-bit values; and, beginning the analysis of I-bit and varied phase delay Q-bit values associated with the modified I clock and modified Q clock having the function-controlled oscillation cycle phase delay at time t3.

8. The method of claim 7 wherein generating digital I and Q phase error signals includes generating new I and Q phase error signals, k reference clock cycles following time t3.

9. A system for function-controlled phase oscillation tracking jitter in a recovered clock signal using an inter-symbol interference (ISI) pattern-weighted early-late phase detector, the system comprising:

a phase interpolator having an output to supply an I clock signal, an output to supply a Q clock signal having the function-controlled oscillation cycle phase delay with respect to the I clock signal, and an input to accept digital I and Q phase error signals;

a deserializer having inputs to accept an analog serial data stream, the I clock, and the function-controlled oscillation cycle phase delay Q clock, and having outputs to supply n-bit digital words of I-bit values generated by sampling the serial data stream with the I clock, n-bit words of varied phase delay Q-bit values generated by sampling the serial data stream with the Q clock having the function-controlled oscillation cycle phase delay, and a reference clock signal equal to the I clock frequency divided by n;

an early-late phase detector having an input to accept the I-bit values, varied phase delay Q-bit values, and the reference clock, and in response to analyzing the I-bit and varied phase delay Q-bit values, identifying an I clock phase correction, the detector also identifying bit sequence patterns associated with each I-bit value, weighting each I-bit value in response to the identified bit sequence pattern and the identified I clock phase correction, and having an output to supply a digital average of the weighted I-bit values for each n-bit digital word;

a jitter tracking module having inputs to accept the I-bit and varied phase delay Q-bit values, and in response to comparing the varied phase delay Q-bit values to the I-bit values, supplying a modulation factor;

a feedback circuit having inputs to accept the average of the weighted I-bit values for each n-bit digital word and the modulation factor, the feedback circuit applying the modulation factor to the weighted I-bit value averages, and having an output to supply the I and Q phase error signals; and, wherein the phase interpolator accepts the I and Q phase error signals and respectively modifies the phases of the I clock and the function-controlled oscillation cycle phase delay Q clock.

10. The system of claim 9 wherein the phase interpolator supplies a function-controlled oscillation cycle phase delay Q clock signal with an average delay of about 90 degrees with respect to the I clock signal phase.

11. The system of claim 9 wherein the phase interpolator generates the function-controlled oscillation cycle phase delay Q clock by generating a Q clock that oscillates between a value having a phase delay of (X−f(d)) and a value having a phase delay of (X+f(d)), where X is the average phase delay of the Q clock with respect to the I clock, and where f(d) is a function with a variable d.

12. The system of claim 11 wherein the phase interpolator generates a function-controlled oscillation cycle phase delay Q clock with a rate of change controlled by the variable d.

13. The system of claim 12 wherein the phase interpolator generates a function-controlled oscillation cycle phase delay Q clock having a triangular cycle delay around the value of X, with a cyclic frequency that decreases as the value of f(d) approaches a maximum value (dfinal), and increases as the value of f(d) approaches zero.

14. The system of claim 13 wherein the phase interpolator generates the function-controlled oscillation cycle phase delay Q clock as follows:
   a) initializing by setting the values of d and dmax to zero;
   b) incrementing the value of dmax one unit value;
   c) incrementing the value of d by one unit value every k reference clock cycles, until d=dmax;
   d decrementing the value of d by one unit value every k reference clock cycles, until d=−(dmax);
   e) incrementing the value of d one unit value each cycle every k reference clock cycles, until d=0;
   f) if dmax <dfinal, repeating Steps b) through e);
   g) if dmax=dfinal, decrementing the value of dmax one unit value;
   h) incrementing the value of d by one unit value every k reference clock cycles, until d=dmax;
   i) decrementing the value of d by one unit value every k reference clock cycles, until d=−(dmax);
   j) incrementing the value of d one unit value every k reference clock cycles, until d=0;
   k) if dmax >0, repeating Steps g through j; and,
   l) if dmax=0, repeating Steps b through f.

15. The system of claim 9 wherein the phase interpolator modifies the I clock and function-controlled oscillation cycle phase delay Q clock phases at time t1 in response to the I and Q phase error signals; and, wherein the early-late phase detector waits a time delay t2 from t1 (t1+t2=t3), where t2 is a delay associated with the deserializer sampling the serial data stream to create I-bit values, and begins the analysis of I-bit and varied phase delay Q-bit values associated with the modified I clock and modified function-controlled oscillation cycle phase delay Q clock at time t3.

16. The system of claim 15 wherein the feedback circuit supplies new I and Q phase error signals k reference clock cycles following time t3.

* * * * *

UNITED STATES PATENT AND TRADEMARK OFFICE
CERTIFICATE OF CORRECTION

Page 1 of 1

PATENT NO.         : 8,180,012 B1
APPLICATION NO.    : 12/574591
DATED              : May 15, 2012
INVENTOR(S)        : Viet Linh Do It is certified that error appears in the above-identified patent and that said Letters Patent is hereby corrected as shown below:

In column 8, line 49, the phrase "at time a" should read as follows: --at time t1--

Signed and Sealed this
Tenth Day of July, 2012

David J. Kappos
*Director of the United States Patent and Trademark Office*